United States Patent
Yan et al.

(10) Patent No.: US 10,165,476 B1
(45) Date of Patent: Dec. 25, 2018

(54) SYSTEMS AND METHODS FOR APPLYING POLICY RULES IN A MOBILE NETWORK

(71) Applicant: Verizon Patent and Licensing Inc., Arlington, VA (US)

(72) Inventors: Lixia Yan, Basking Ridge, NJ (US); Marc Jason Chiaverini, Randolph, NJ (US); James Mathison, Warren, NJ (US); Barry F. Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/037,931

(22) Filed: Jul. 17, 2018

(51) Int. Cl.
*H04W 36/00* (2009.01)
*H04W 36/08* (2009.01)
*H04W 64/00* (2009.01)

(52) U.S. Cl.
CPC ....... *H04W 36/0033* (2013.01); *H04W 36/08* (2013.01); *H04W 64/00* (2013.01)

(58) Field of Classification Search
CPC .. H04W 36/0033; H04W 36/08; H04W 64/00
USPC ...... 455/436, 442, 422.1, 456.1, 432.1, 331; 370/331
See application file for complete search history.

(56) References Cited

U.S. PATENT DOCUMENTS

| | | | |
|---|---|---|---|
| 7,991,385 B1 * | 8/2011 | Rosenberg | G06Q 20/102 370/328 |
| 8,929,856 B1 * | 1/2015 | Kamboh | H04L 61/1511 455/404.2 |
| 2016/0197781 A1 * | 7/2016 | Smith | H04L 41/0806 370/254 |

* cited by examiner

*Primary Examiner* — Nghi H Ly

(57) ABSTRACT

A network device receives, from a base station included in a network, location information associated with a user equipment included in the network. The network device determines, based on the location information, a cell type associated with a cell that is associated with the base station. The network device transmits, based on determining the cell type, a notification to a second network device included in the network, where the second network device, based on receiving the notification, determines a policy rule associated with the cell type, and where the second network device transmits the policy rule.

20 Claims, 15 Drawing Sheets

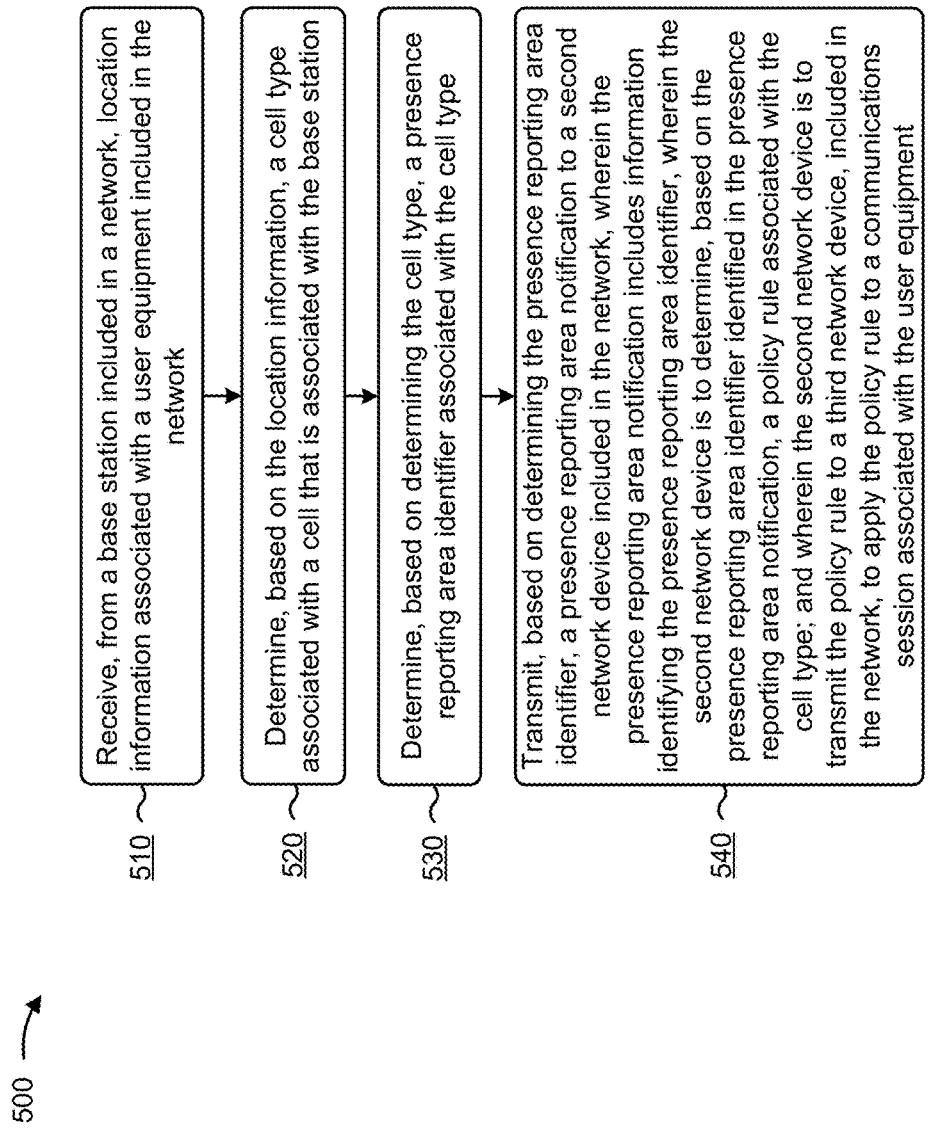

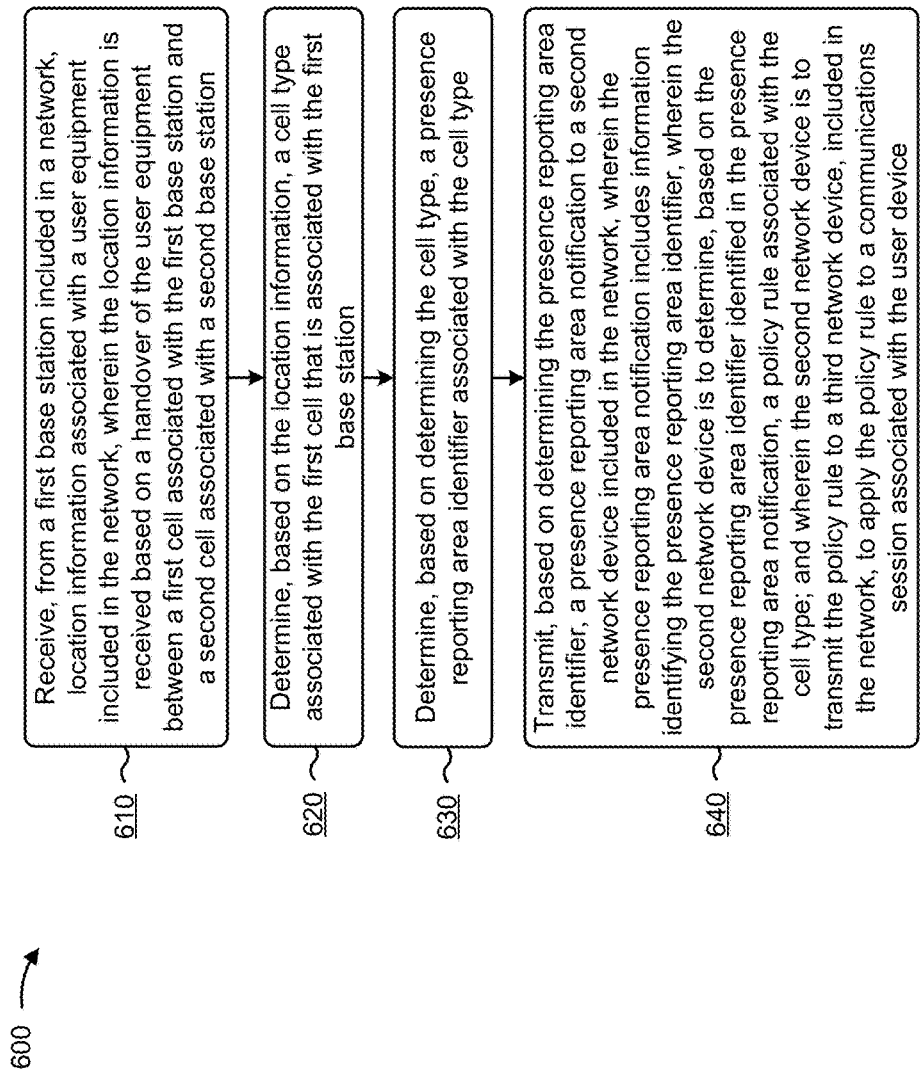

US 10,165,476 B1

SYSTEMS AND METHODS FOR APPLYING POLICY RULES IN A MOBILE NETWORK

BACKGROUND

In some mobile networks, a network device, such as a packet data network gateway device (PGW), a user plane function device (UPF), and/or the like, may apply policy rules to a session associated with a user equipment included in the mobile network.

BRIEF DESCRIPTION OF THE DRAWINGS

FIG. 5 is a flow chart of an example process for applying policy rules in a mobile network.

FIG. 6 is a flow chart of an example process for applying policy rules in a mobile network.

DETAILED DESCRIPTION OF PREFERRED EMBODIMENTS

Figure 1A:
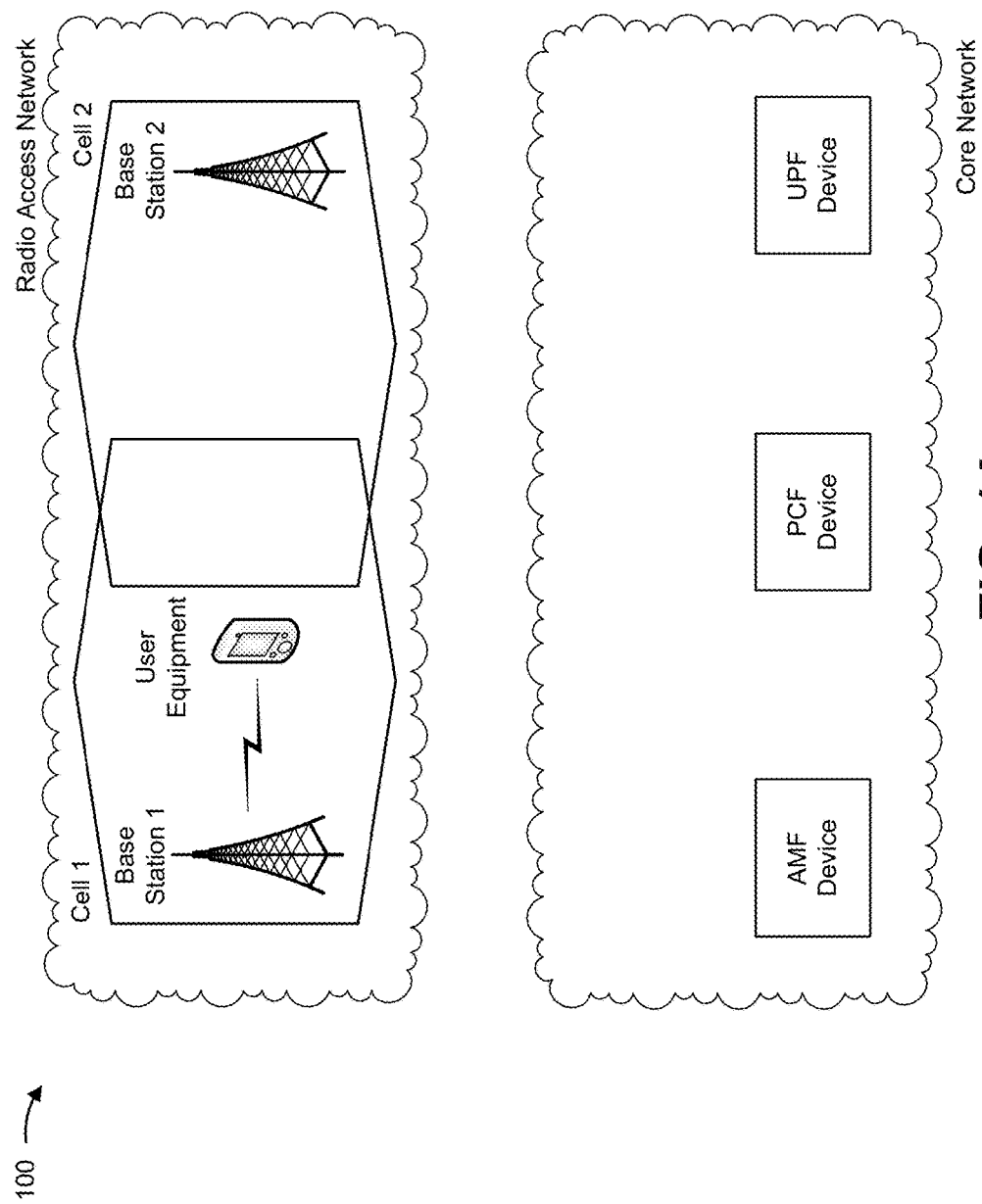
FIGS. 1A-1J are diagrams of an example implementation described herein.

The following detailed description of example implementations refers to the accompanying drawings. The same reference numbers in different drawings may identify the same or similar elements.

In some cases, policy rules applied to a communications session associated with a user equipment may change based on, for example, a change in a location of the user equipment in the mobile network. As an example, the user equipment may move into a cell, associated with a base station included in the mobile network, that is associated with a stadium (e.g., a football stadium, a concert venue, and/or the like), and an operator of the mobile network may generate a policy rule that specifies a bandwidth limitation (e.g., 4 megabits per second, 2 megabits per second, etc.) for the user equipment while the user equipment is located in the cell associated with the stadium. In this way, available bandwidth may be more evenly distributed in cells that experience a large influx of user equipments in a particular period of time.

Some implementations described herein provide a first network device that may receive, from a base station included in a network, location information associated with a user equipment included in the network, and may determine, based on the location information, a cell type (or a plurality of cell types) associated with a cell that is associated with the base station. The first network device may transmit, based on determining the cell type(s), a notification to a second network device included in the network. In this way, the second network device may receive the notification, may determine, based on receiving the notification, a policy rule (or a plurality of policy rules) associated with the cell type(s), and may transmit the policy rule(s) to a third network device, included in the network, to apply the policy rule(s) to a communications session associated with the user equipment.

In this way, the first network device does not need to store and maintain a list of cells in the mobile network and the policy rules associated with the cells. This reduces the usage of storage resources of the first network device, as well as reduces the complexity of operating and maintaining the mobile network. Moreover, in this way, policy rules may be applied differently in different cells in the mobile network, which allows the mobile network to accommodate different and/or changing operating conditions in different cells, as well as combinations of different operating conditions in a particular cell, which in turn allows the mobile network to more efficiently use available network resources, i.e., bandwidth, spectrum, backhaul, etc. as well as to customize and optimize coverage and capacity in the mobile network.

FIGS. 1A-1J are diagrams of an example implementation 100 described herein. As shown in FIGS. 1A-1J, implementation 100 may include a user equipment, a radio access network, a core network, and/or the like. In some implementations, the user equipment, the radio access network, and the core network may be included in a mobile network, such as a third generation (3G) mobile network, a fourth generation (4G) mobile network, a fifth generation (5G) mobile network, and/or the like.

The radio access network may include a plurality of base stations, (e.g., base station 1, base station 2, etc.) (collectively referred to as "base stations" and individually as "base station"). In some implementations, each base station may be associated with a cell in the radio access network (e.g., base station 1 may be associated with cell 1, base station 2 may be associated with cell 2, etc.). While the example illustrated in FIGS. 1A-1J shows the radio access network including base station 1 and base station 2, the mobile network may include a greater or fewer quantity of base stations. Moreover, while the example illustrated in FIGS. 1A-1J shows base station 1 being associated with cell 1 and base station 2 being associated cell 2, base station 1 may be associated with cell 1, cell 2, and/or other cells in the radio access network, base station 2 may be associated with cell 1, cell 2, and/or other cells in the radio access network, other base stations in the radio access network may be associated with cell 1 and/or cell 2, and/or the like.

In some implementations, the user equipment may communicatively connect with the mobile network via the base station when the user equipment is located within the cell associated with the base station. In some implementations, as explained above, a cell (e.g., cell 1) may be associated with a plurality of base stations. Accordingly, each base station, of the plurality of base stations, may provide a portion of the coverage area within the cell.

In some implementations, cell 1 and cell 2 may at least partially overlap (e.g., one or more portions of cell 1 may overlap one or more portions of cell 2). As the user equipment moves from cell 1 to cell 2, base station 1 may hand over the user equipment to base station 2 (e.g., so that the user equipment is transitioned from being served by base station 1 to being served by base station 2) while the user equipment is in an overlapping portion of cell 1 and cell 2. Similarly, as the user equipment moves from cell 2 to cell 1, base station 2 may hand over the user equipment to base station 1 (e.g., so that the user equipment is transitioned from being served by base station 2 to being served by base station 1) while the user equipment is in an overlapping portion of cell 2 and cell 1. In this way, continuity of service for the user equipment is maintained during the handover.

The core network may include various network devices, such as an AMF device, a policy control function (PCF) device, a user plane function (UPF) device, and/or the like. The AMF device may be responsible for handling mobility management for the user equipment in the mobile network. The UPF device may be responsible for providing the user equipment with access to one or more networks communicatively connected to the mobile network. For example, the UPF device may receive traffic, from the user equipment, transmitted in a communications session associated with the user equipment, and may forward the traffic to the one or more networks, to another UPF device included in the mobile network, to another UPF device included in another mobile network, and/or the like. Similarly, the UPF device may receive traffic, from another entity, transmitted in the communications session associated with the user equipment, and may forward the traffic to the user equipment via a base station included in the mobile network (e.g., base station 1, base station 2, etc.).

In some implementations, the UPF device may apply one or more policy rules to the communications session associated with the user equipment. For example, the UPF device may receive the one or more policy rules from the PCF device via a session management function (SMF) device, and may apply process traffic transmitted in the communications session based on the one or more policy rules. In some implementations, the SMF device and/or PCF device may transmit the one or more policy rules to the AMF device, depending on the contents of the one or more policy rules, so that the AMF device may apply the one or more policy rules to the communications session. For example, the SMF device may transmit a policy rule to the AMF to control the scheduling treatment of the communications session (e.g., to increase or decrease the priority of the communications session), and/or the like.

In some implementations, the AMF device may store location information associated with the user equipment, such as information identifying a geographical location of the user equipment (e.g., world geodetic system (WGS) coordinates associated with the user equipment's geographical location, coordinates associated with the user equipment's geographical location expressed in another coordinate system, and/or the like), information identifying a cell identifier associated with a cell in which the user equipment is located, information identifying a base station identifier associated with a base station to which the user equipment is communicatively connected and is serving the user equipment, and/or the like. In some implementations, the AMF device may update the location information, associated with the user equipment, stored at the AMF device. For example, the AMF device may update the location information based on an occurrence of an event, such as a handover of the user equipment from one base station to another base station included in the mobile network, the user equipment communicatively connecting to the mobile network, the user equipment disconnecting from the mobile network, and/or the like.

In some implementations, the AMF device may store information identifying a plurality of cell types. Each cell type, of the plurality of cell types, may correspond to a cell property that may be associated with a cell included in the mobile network. For example, a high-bandwidth cell type may be a cell type that corresponds to a cell, included in the mobile network, being capable of providing a high-bandwidth connection in the cell. Such a cell may be a high-frequency (e.g., 47 GHz, 60 GHz, etc.) and/or short-range cell that offers high peak data rates in the cell (e.g., 2 gigabits per second, 7 gigabits per second, etc.). As another example, a stadium cell type may be a cell type that corresponds to cell in which a stadium, a concert hall, and/or another type of venue is located. Other examples of cell types may include a low-bandwidth cell type (e.g., a cell capable of providing a low-bandwidth connection in the cell), a mall cell type (e.g., a cell in which a mall is located), a police station cell type (e.g., a cell in which a police station is located), a hospital cell type (e.g., a cell in which a hospital is located), an airport cell type (e.g., a cell in which an airport is located), and/or the like. In some implementations, the AMF may update the information identifying the plurality of cell types, for example, by adding new cell types, removing cell types, and/or the like.

The PCF device may be responsible for generating, storing, and providing policy rules in the mobile network. The policy rules may include, for example, a traffic steering rule (e.g., a rule that controls how traffic is routed and/or forwarded), a usage reporting rule (e.g., a rule associated with collecting statistics about traffic forwarded), a packet inspection rule (e.g., a rule that controls whether a packet is inspected and/or a level of inspection for the packet), a quality of service (QoS) rule (e.g., a rule that controls how traffic is processed or prioritized), a charging rule (e.g., a rule that controls whether traffic is to be taken into account when charging a user of the mobile network), and/or the like. In some implementations, the PCF may provide one or more policy rules to the UPF device (e.g., via a SMF device) and/or to the AMF device so that the UPF device and/or the AMF device may apply the one or more policy rules. For example, the PCF may provide the one or more policy rules to the UPF device and/or the AMF device so that the UPF device and/or the AMF device may apply the one or more policy rules to a communications session associated with the user equipment.

In some implementations, the PCF device may associate one or more policy rules with a particular cell type or a particular combination of cell types. The PCF device may store the associations between policy rules and cell types in a data structure associated with the PCF device and/or another device included in the core network. In this way, when the user equipment is located in a cell, the PCF device may provide one or more policy rules, associated with a cell type of the cell, to the UPF device so that the UPF device may apply the one or more policy rules to a communications session associated with the user equipment. For example, the PCF device may associate, with a stadium cell type, a QoS rule that specifies a limit to an amount of bandwidth the user equipment is allowed to use (e.g., 3 megabits per second, 5 megabits per second, etc.) when the user equipment is located in a cell associated with the stadium cell type. In this way, the available bandwidth in the cell may be more evenly spread across a large quantity of user equipments that may be present in a stadium located in the cell. As another example, the PCF device may associate, with a hospital cell type, a QoS rule that specifies the user equipment is to be given a lesser resource scheduling priority relative to one or more user equipments associated with hospital personnel when the user equipment is located in a cell associated with the hospital cell type. In this way, communications associated with a hospital located in the cell can be prioritized over non-hospital communications. As a further example, the PCF device may associate one or more policy rules with a combination of cell types, such as a combination of a stadium cell type and a high-bandwidth cell type. In this way, policy rules may be optimized for cells associated with a plurality of cell types.

In some implementations, to apply one or more policy rules to a communications session associated with a user equipment based on a cell type associated with a cell in which the user equipment is located, the PCF device may provide a request to the AMF device to provide the PCF device with notification when the user equipment is handed over to a base station associated with the cell. As a result, the AMF device may receive, from the base station, location information associated with the user equipment, may determine the cell type associated with the cell based on the location information, and may transmit the notification to the PCF device based on determining the cell type.

To illustrate the above, and turning to FIG. 1A, the user equipment may be located within cell 1 and may be communicatively connected to base station 1 such that base station 1 is serving the user equipment.

Figure 1B:
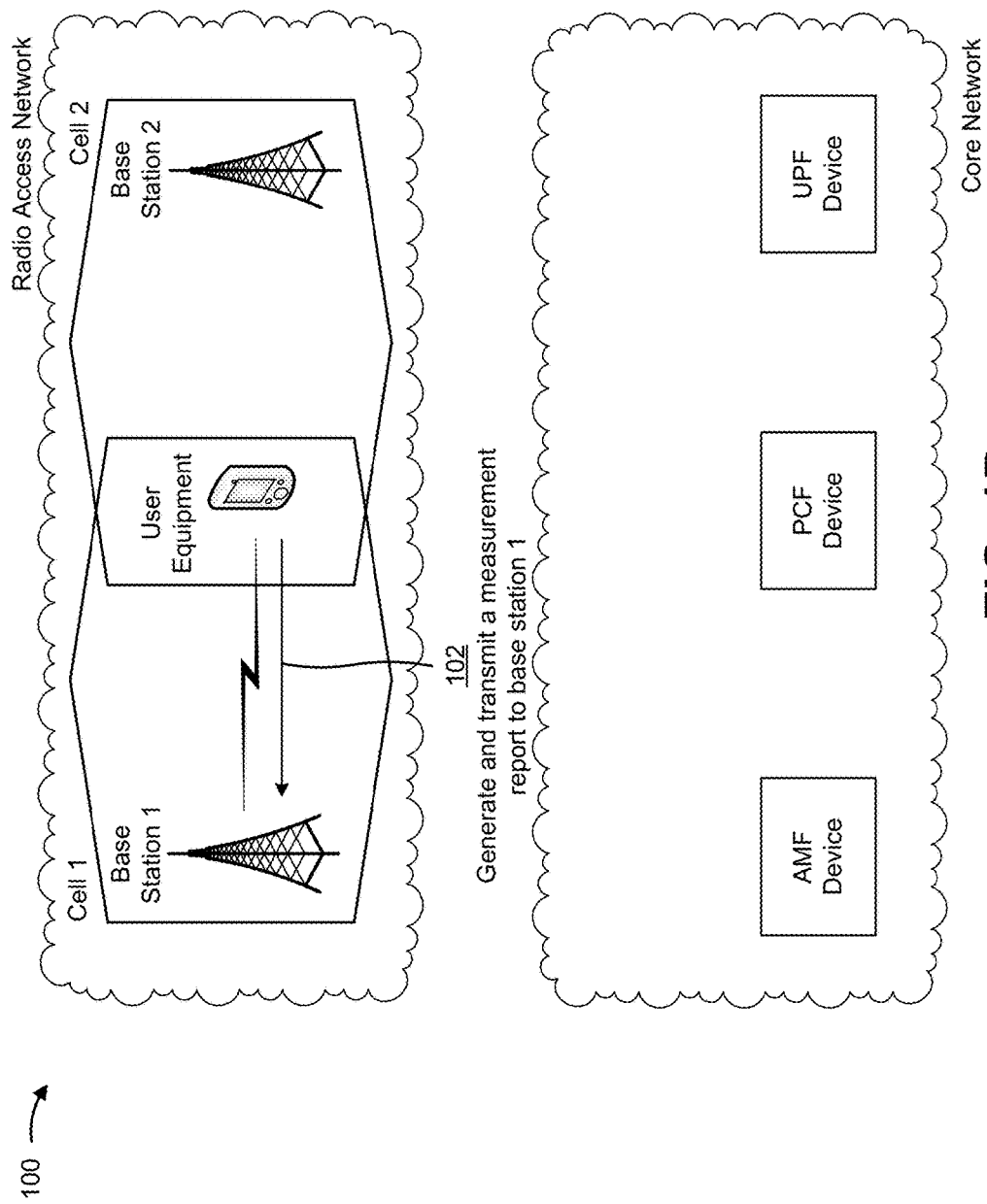

Turning to FIG. 1B, the user equipment may move to another geographic location such that it is located within cell 1 and cell 2 while still being communicatively connected to base station 1. As shown by reference number 102, the user equipment may generate and transmit a measurement report to base station 1. The measurement report may include information identifying various measurements associated with cell 1 and/or cell 2 that were performed by the user equipment. For example, the measurement report may include information identifying a reference signals received power (RSRP) measurement associated with cell 1, information identifying a RSRP measurement associated with cell 2, a reference signal received quality (RSRQ) measurement associated with cell 1, a RSRQ measurement associated with cell 2, a received signal strength indicator (RSSI) measurement associated with cell 1, a RSSI measurement associated with cell 2, a received signal code power (RSCP) measurement associated with cell 1, a RSCP measurement associated with cell 2, and/or the like.

In some implementations, the user equipment may periodically generate and transmit the measurement report. For example, the user equipment may periodically generate and transmit the measurement report once every minute, once every five minutes, and/or the like. In some implementations, the user equipment may generate and transmit the measurement report based on an occurrence of an event. For example, the user equipment may generate and transmit the report based on determining that one or more measurements associated with cell 1 does not satisfy a threshold (e.g., based on determining that a RSRP measurement associated with cell 1 does not satisfy a RSRP threshold, based on determining that a RSRQ measurement associated with cell 1 does not satisfy a threshold, etc.), based on determining that one or more measurements associated with cell 2 satisfies a threshold (e.g., based on determining that a RSSI measurement associated with cell 2 satisfies a RSSI threshold, based on determining that a RSCP measurement associated with cell 2 satisfies a threshold, etc.), based on determining that one or more measurements associated with cell 1 is less than one or more measurements associated with cell 2 (e.g., based on determining that a RSRP measurement associated with cell 1 is less than a RSRP measurement associated with cell 2, based on determining that the RSRP measurement associated with cell 1 and a RSRQ measurement associated with cell 1 are respectively less than the RSRP measurement associated with cell 2 and a RSRQ measurement associated with cell 2, etc.), and/or the like.

Figure 1C:
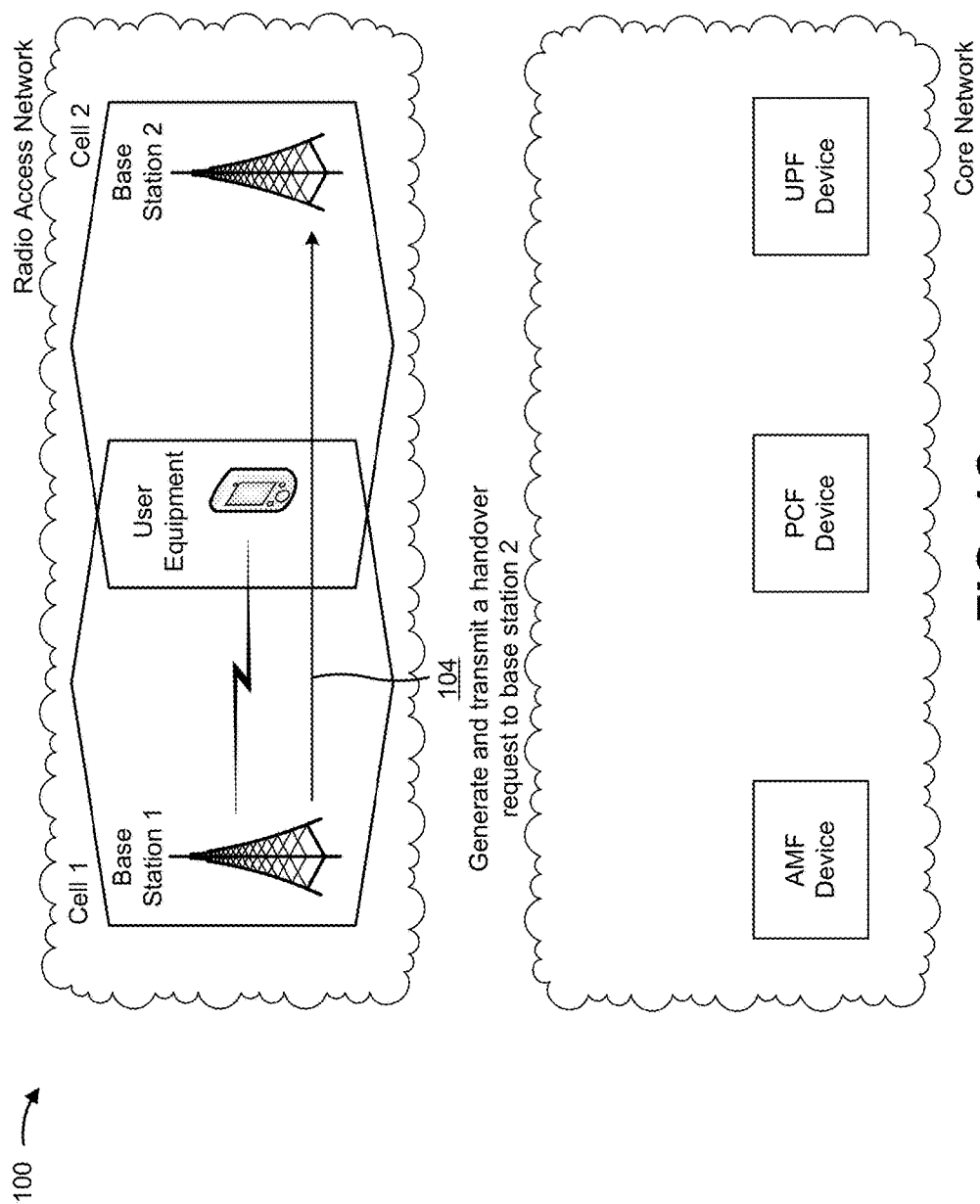

Turning to FIG. 1C, base station 1 may receive the measurement report from the user equipment and may determine to hand over the user equipment to base station 2 based on receiving the measurement report. For example, base station 1 may determine to hand over the user equipment to base station 2 based on identifying, in the measurement information included in the measurement report, one or more of the measurements associated with cell 1 described above, and determining that the one or more measurements do not satisfy a threshold; based on identifying, in the measurement information included in the measurement report, one or more of the measurements associated with cell 2 described above, and determining that the one or more measurements satisfy a threshold; based on determining that the one or more measurements associated with cell 1 are less than the one or more measurements associated with cell 2; and/or the like. As shown by reference number 104, base station 1 may generate and transmit a handover request to base station 2 based on determining to hand over the user equipment to base station 2.

Figure 1D:
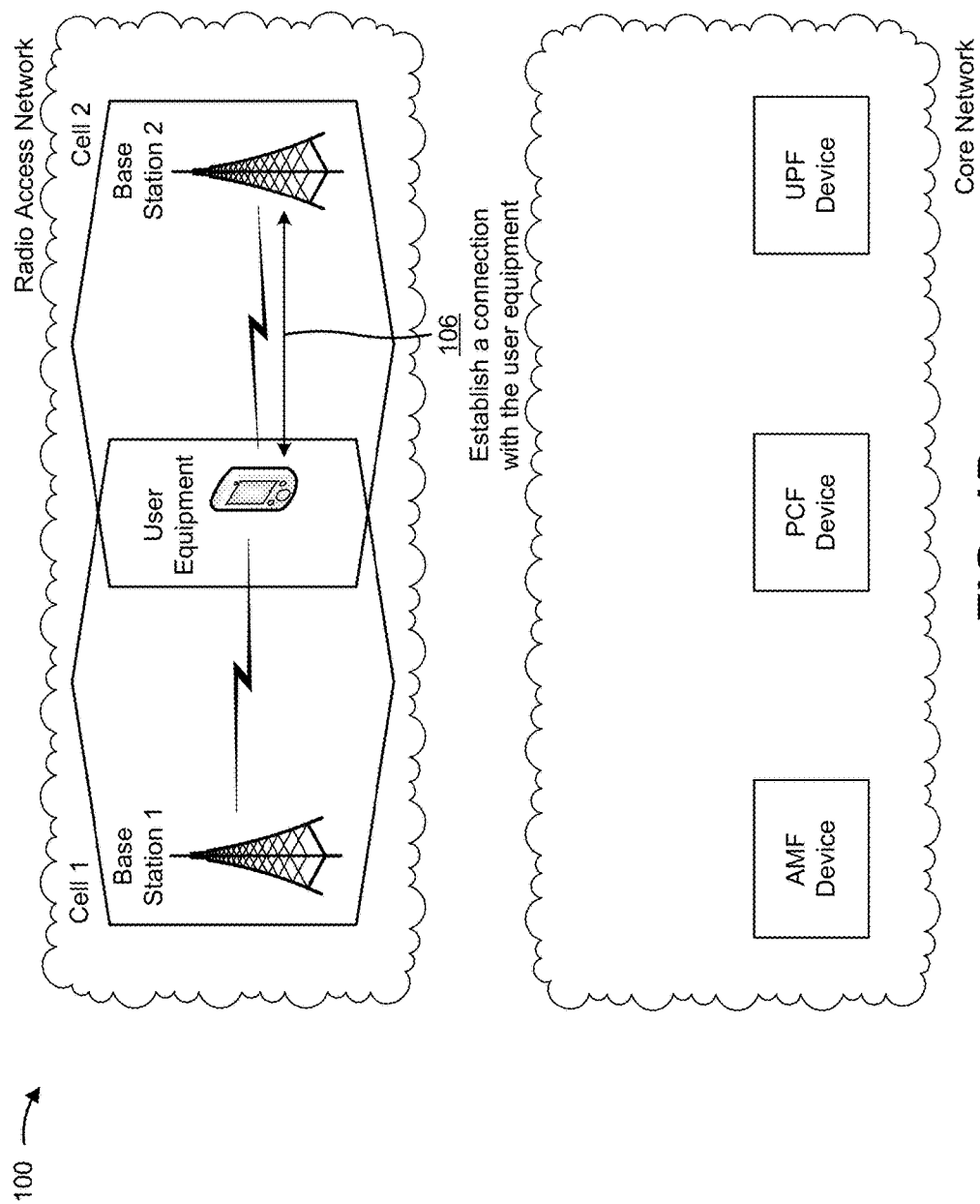

Turning to FIG. 1D, base station 2 may receive the handover request from base station 1. As shown by reference number 106, base station 2 may establish a connection with the user equipment based on receiving the handover request. For example, base station 2 may establish the connection with the user equipment by transmitting a connection request to the user equipment. The user equipment may acknowledge the connection request and may proceed with connecting to base station 2.

Figure 1E:
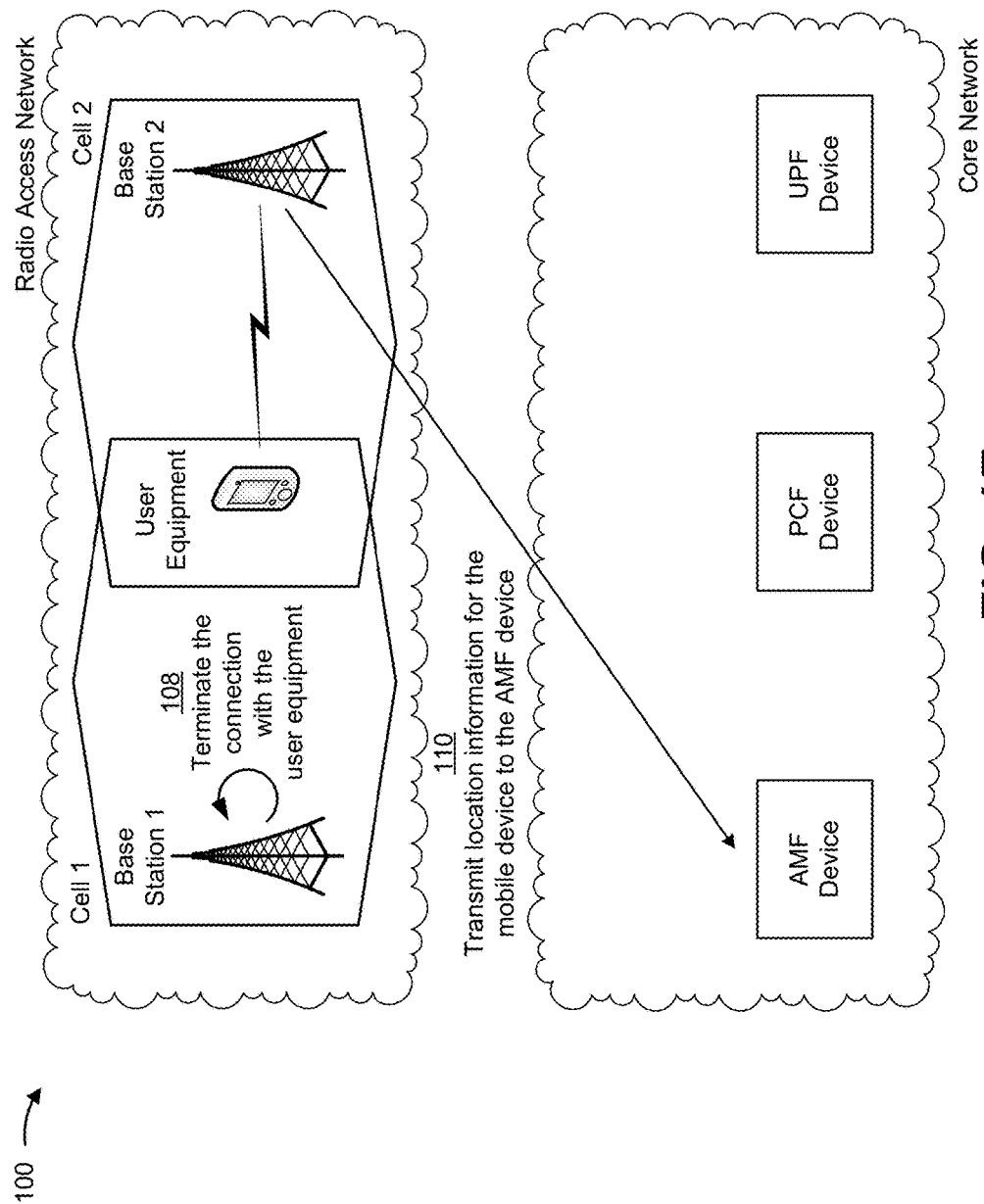

Turning to FIG. 1E, and as shown by reference number 108, base station 1 may terminate the connection between base station 1 and the user equipment. For example, base station 1 may terminate the connection between base station 1 and the user equipment based on receiving a request from base station 2 to release the connection, based on receiving a request from the user equipment to release the connection, and/or the like. In this way, base station 2 becomes the serving base station of the user equipment. In some implementations, base station 1 may transmit, to base station 2, a confirmation that the connection between base station 1 and the user equipment has been terminated.

As shown by reference number 110, base station 2 may transmit location information associated with the user equipment to the AMF device. For example, base station 2 may transmit the location information based on determining that the connection between base station 1 and the user equipment has been terminated (e.g., based on receiving the confirmation from base station 1), based on establishing the connection between base station 2 and the user equipment, and/or the like. In this way, base station 2 ensures that the AMF device has the most up-to-date information for the user equipment. In some implementations, the AMF device may receive the location information in a signaling message on an interface, such as a S1 interface, an N2 interface, and/or the like.

In some implementations, the location information associated with the user equipment may include various pieces of information, such as information identifying an identifier associated with the user equipment (e.g., an international mobile subscriber identity (IMSI), an international mobile equipment identity (IMEI), a mobile equipment identifier (MEID), an electronic serial number (ESN), and/or another type of identifier), information identifying a geographical location associated with the user equipment, information identifying a base station identifier associated with base station 2, information identifying a cell identifier associated with cell 2, information identifying a cell type (or a plurality of cell types) associated with cell 2, and/or the like.

In some implementations, base station 2 may include the information identifying the cell type associated with cell 2 in a field (e.g., a cell type field) of the S1 or N2 message. In some implementations, base station 2 may include the information identifying the cell type associated with cell 2, along with the information identifying the base station identifier associated with base station 2 and the information identifying the cell identifier associated with cell 2, in an identifier that identifies the combination of base station 2 and cell 2. For example, the identifier that identifies the combination of base station 2 and cell 2 may include a next generation cell identifier (NCI). The NCI associated with the combination of base station 2 and cell 2 may include a plurality of bits (e.g., 36 bits, 44 bits, 52, bits, etc.), where one or more first bits (e.g., 22 bits, 28, bits, 32 bits, etc.) may identify the base station identifier associated with base station 2, one or more second bits (e.g., 4 bits, 8 bits, 14, bits, etc.) may identify the cell identifier associated with cell 2, and one or more third bits (e.g., 8 bits, 16 bits, etc.) may identify the cell type associated with cell 2. In this way, the cell type associated with cell 2 is identified in the NCI associated with the combination of base station 2 and cell 2. In this way, information identifying the cell type associated with cell 2 is maintained at base station 2 instead of the AMF device, which eliminates the need for the AMF device to store and maintain information identifying the cell type of cell 2, which in turn reduces complexity of operating and maintain the mobile network.

In some implementations, the cell type associated with cell 2 may be encoded in a data string, such as a bit string, an alphanumeric string, and/or another type of string included in the cell type field of the S1 or N2 message and/or in the one or more third bits included in the NCI. In some implementations, the bit string may be an index where each bit position in the bit string corresponds to a particular cell type. As an example, a bit string of 00000001 may correspond to a stadium cell type, a bit string of 00000010 may correspond to a mall cell type, a bit string of 00000100 may correspond to a high-bandwidth cell type, a bit string of 00000000 may correspond to no cell type (or a normal cell type), a bit string of 00000101 may correspond to a combination of a high-bandwidth cell type and a stadium cell type, and so on. In some implementations, each unique combination of values in the bit string may correspond to a cell type. As an example, a bit string of 00000001 may correspond to a hospital cell type, a bit string of 00000010 may correspond to a police station cell type, a bit string of 00000011 may correspond to a high-bandwidth cell type, a bit string of 00000101 may correspond to a stadium cell type, and so on. In some implementations, other types of encoding and/or representations data may be used to represent cell types.

Figure 1F:
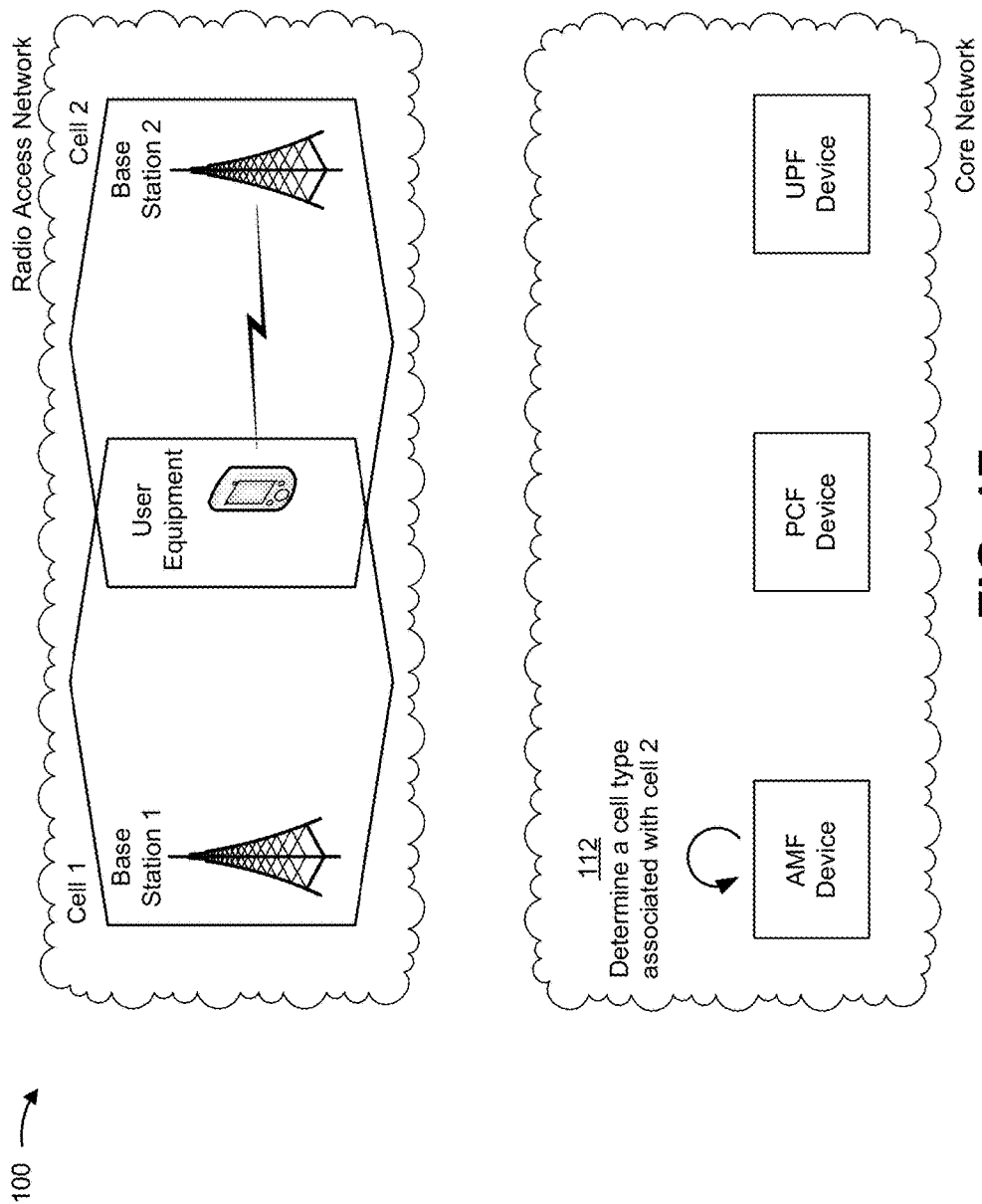

Turning to FIG. 1F, and as shown by reference number 112, the AMF device may determine a cell type (or a plurality of cell types) associated with cell 2. In some implementations, the AMF device may determine the cell type associated with cell 2 by identifying the bit string, associated with the cell type, included in the NCI received in the location information associated with the user equipment. In some implementations, the AMF device may determine the cell type associated with cell 2 by identifying the bit string in the cell type field of the S1 or N2 message received from base station 2.

The AMF device may compare the identified bit string to bit strings associated with the plurality of cell types stored in the information, stored at the AMF device, identifying the plurality of cell types. For example, the AMF device may "walk" through the identified bit string bit by bit (e.g., starting with the right-most bit, starting with the left-most bit, etc.) to identify one or more bit positions in the identified bit string that is set to a 1 value, and may identify one or more cell types, of the plurality of cell types, associated with a 1 value in the one or more bit positions. For example, the identified bit string may be 00100100, and the AMF device may identify the 1 value in the third bit position from the right of the bit string, may identify a cell type, of the plurality of cell types, associated with a 1 value in the third bit position; may identify the 1 value in the sixth bit position from the right of the bit string, may identify a cell type, of the plurality of cell types, associated with a 1 value in the sixth bit position; and so on.

Figure 1G:
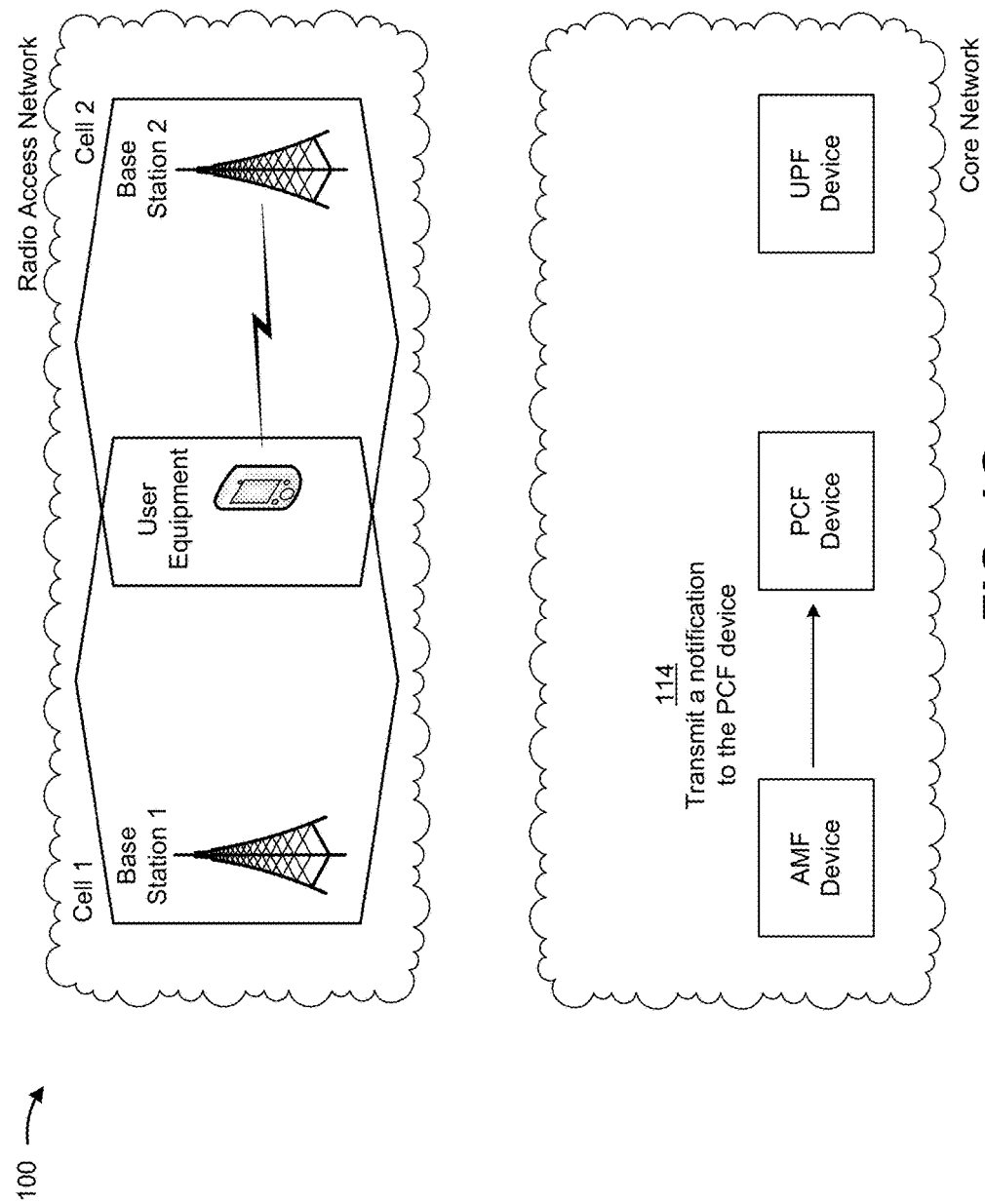

Turning to FIG. 1G, and as shown by reference number 114, the AMF device may generate and transmit a notification to the PCF device. In some implementations, the AMF device may transmit the notification directly to the PCF device, via another device in the core network (e.g., a SMF), and/or the like. In some implementations, the AMF device may generate and transmit the notification based on determining the cell type associated with cell 2, based on determining that the user equipment has moved to a cell with a different cell type (e.g., based on determining that the user equipment has moved from cell 1 to cell 2, and that cell 1 and cell 2 are associated with different cell types), and/or the like. In some implementations, the AMF device may generate and transmit the notification based on determining that the PCF device has provided the AMF device with a request to receive notifications associated with the user equipment.

In some implementations, the notification may include information identifying the user equipment, information identifying that the user equipment is located in cell 2, information identifying the cell type associated with cell 2, and/or the like. For example, the notification may be a presence reporting area notification, and the PCF device may provide the AMF device with a request to receive the presence reporting area notification when the user equipment is located in a particular presence reporting area. In some implementations, a presence reporting area may be associated with a particular cell type, with a plurality of cell types, and/or the like, and may be associated with a particular presence reporting area identifier. For example, a mall cell type may be associated with a presence reporting area having a presence reporting area identifier 15. Accordingly, the information identifying the cell type, associated with cell 2, included in the presence reporting area notification may include information identifying the presence reporting area identifier associated with the presence reporting area associated with the cell type that is associated with cell 2.

Figure 1H:
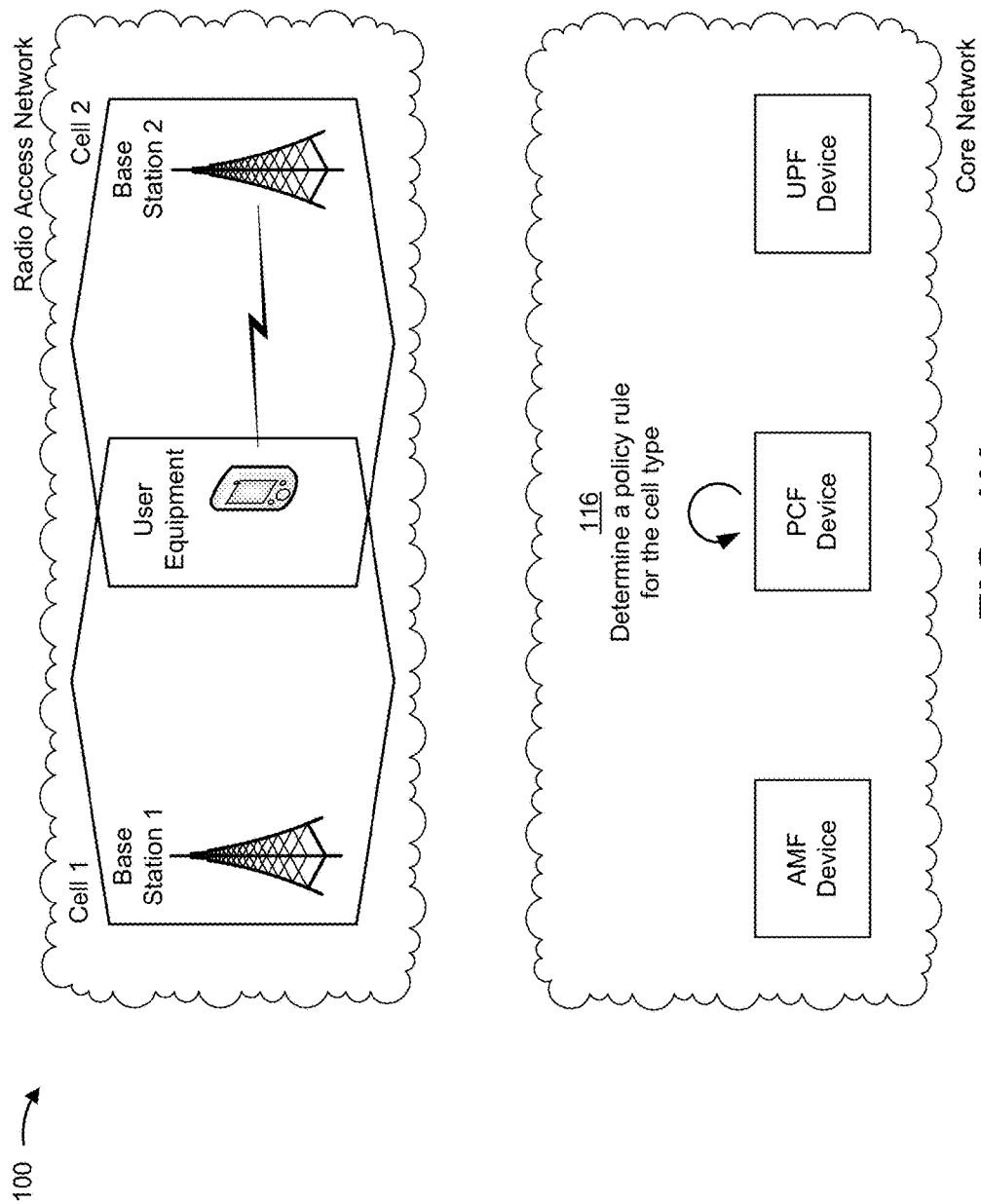

Turning to FIG. 1H, the PCF device may receive the notification from the AMF device. As shown by reference number 116, the PCF device may determine a policy rule associated with the cell type that is associated with cell 2. As explained above, the PCF device may store information identifying associations between policy rules and cell types in a data structure associated with the PCF device and/or another device included in the core network. Accordingly, the PCF device may identify the cell type associated with cell 2 based on the information included in the notification, may identify information associated with the cell type in the data structure, and may identify information identifying a policy rule that is associated with the cell type in the data structure.

In some implementations, where the notification is a presence reporting area notification, the information identifying associations between policy rules and cell types in the data structure may include information identifying associations between policy rules and presence reporting area identifiers. In this way, the PCF device may identify, in the presence reporting area notification, the presence reporting area identifier associated with the presence reporting area associated with the cell type that is associated with cell 2. The PCF device may identify information associated with the presence reporting area identifier in the data structure, and may identify information identifying a policy rule that is associated with the presence reporting area identifier in the data structure. In some implementations, where a cell is associated with a plurality of cell types, the information identifying the plurality of cell types, included in the presence reporting area notification, may include information identifying a plurality of presence reporting area identifiers associated with a plurality of presence reporting areas, wherein each presence reporting area identifier is associated a particular presence reporting area that is associated with a particular cell type, of the plurality of cell types, associated with the cell.

Figure 1I:
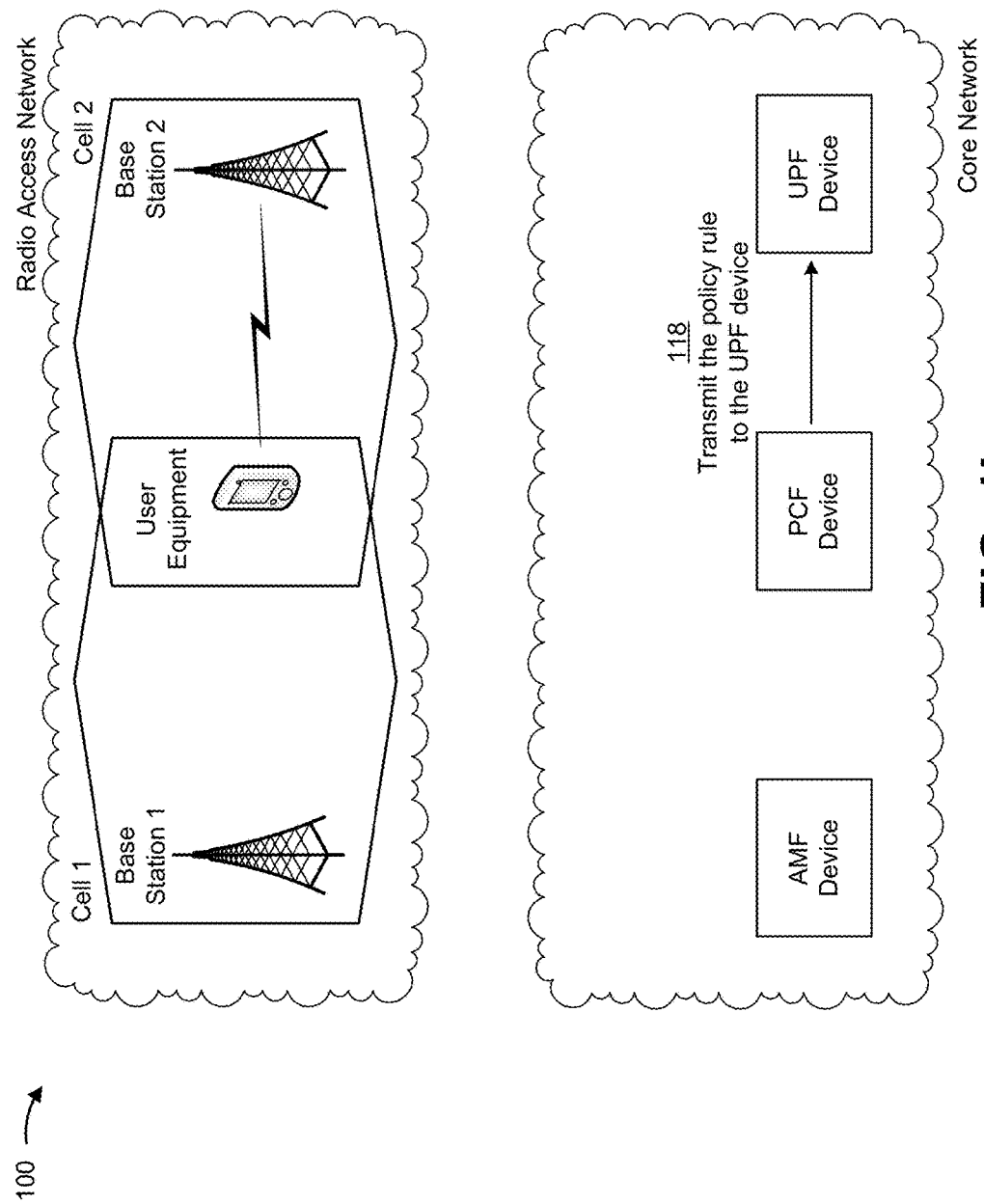

Turning to FIG. 1I, and as shown by reference number 118, the PCF device may transmit the policy rule to the UPF device. In some implementations, the PCF device may transmit the policy rule to the UPF device based on identifying the policy rule associated with the cell type of cell 2. In some implementations, the PCF device may provide the policy rule through another device included in the core network such as a SMF device, and/or the like.

Figure 1J:
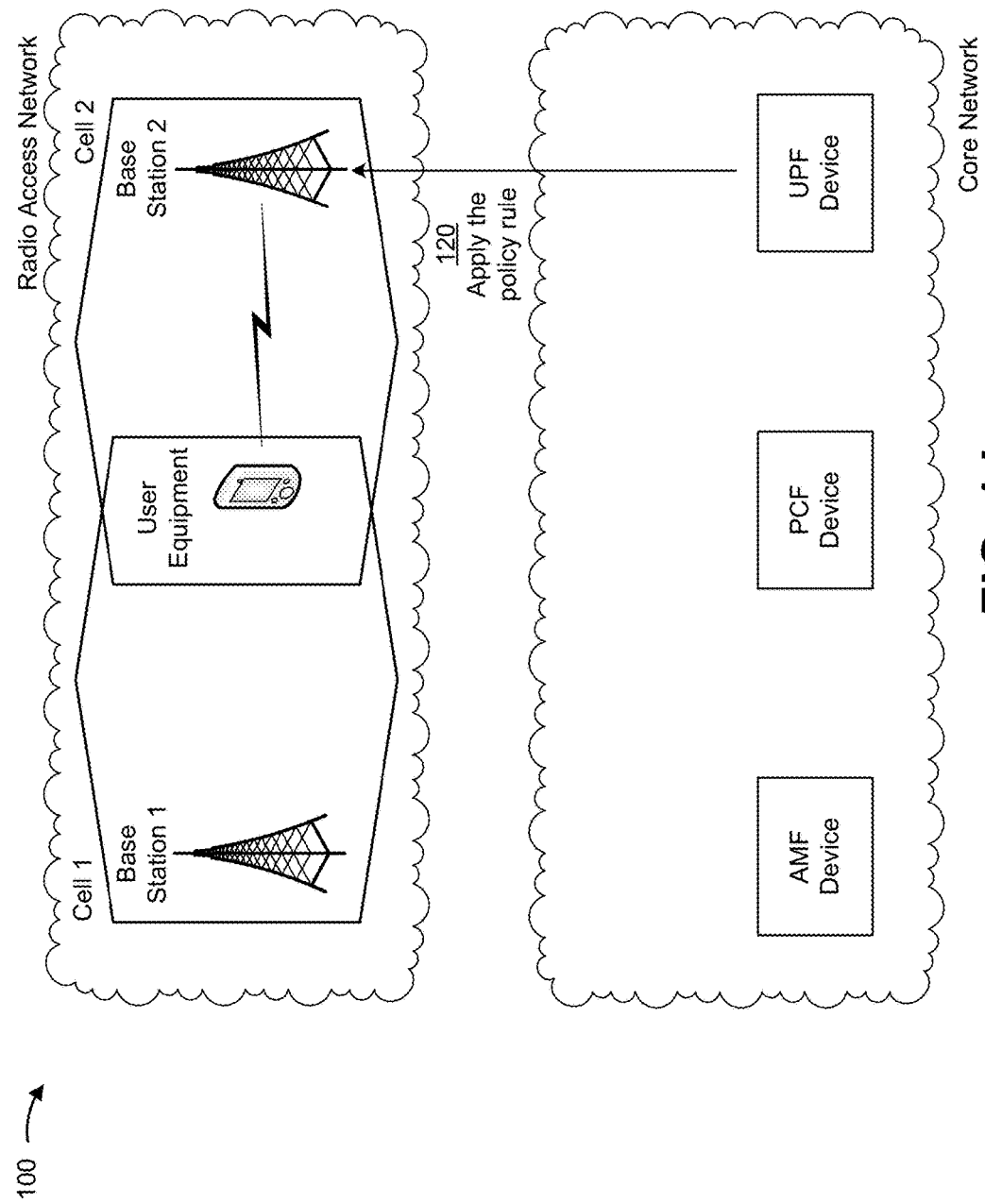

Turning to FIG. 1J, the UPF device may receive the policy rule associated with the cell type of cell 2. As shown by reference number 120, the UPF device may apply the policy rule to a communications session associated with the user equipment. In some implementations, the UPF device may apply the policy rule to the communications session associated with the user equipment based on receiving the policy rule, based on determining that the communications session has been established, and/or the like. For example, if the policy rule specifies a bandwidth limitation (e.g., the user equipment is limited to 1 megabit per second), and the user equipment is receiving a video stream in a communications session with a content delivery server, the UPF may apply the policy rule by limiting the video stream to a 1 megabit per second transfer rate.

In this way, the AMF device does not need to store and maintain a list of cells in the mobile network and the policy rules or cell types associated with the cells. This reduces the usage of storage resources of the AMF device, as well as reduces the complexity of operating and maintaining the mobile network. Moreover, in this way, policy rules may be applied differently in different cells in the mobile network, which allows the mobile network to accommodate different and/or changing operating conditions in different cells, as well as combinations of different operating conditions in a particular cell, which in turn allows the network to more efficiently use available network resources as well as customize and optimize coverage and capacity in the mobile network.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of implementation 100 may perform one or more functions described as being performed by another set of devices of implementation 100.

Figure 2:
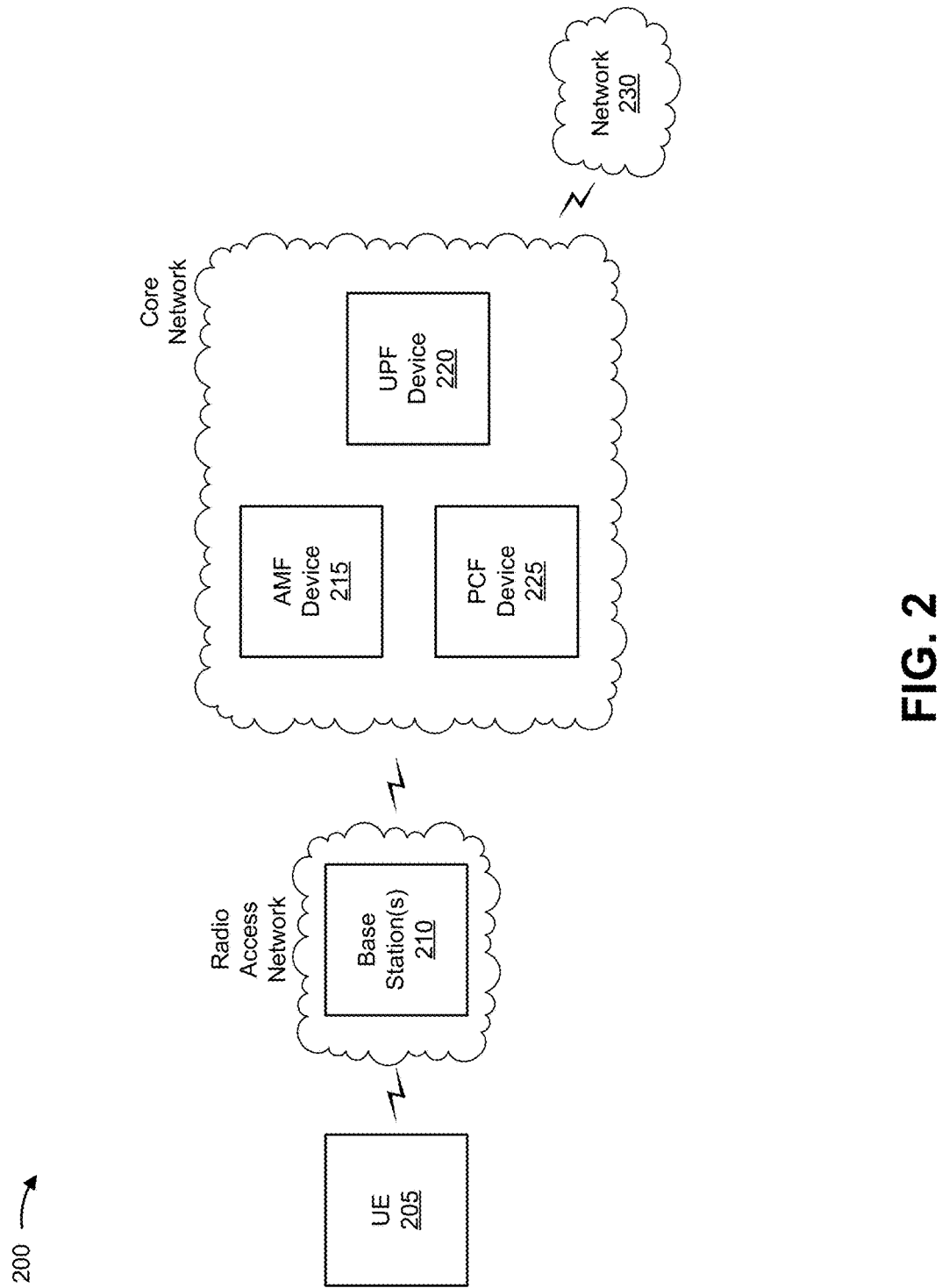
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment (UE) 205; one or more base stations 210 (collectively referred to as "base stations 210" and individually as "base station 210"); an AMF device 215; a UPF device 220; a PCF device 225; and a network 230. Devices of environment 200 may interconnect via wired connections, wireless connections, or a combination of wired and wireless connections.

Some implementations may be performed within a 5G network, a 3G network, a 4G network, a long-term evolution (LTE) network, and/or the like.

Environment 200 may include a radio access network (RAN), such as a 5G next generation RAN (NG-RAN, a 3G universal mobile telecommunications system (UMTS) RAN (UTRAN), a LTE evolved UTRAN (E-UTRAN), and/or the like. The RAN may include one or more base stations 210 via which UE 205 communicates with the core network. The core network may include a 5G next generation core network (NG Core), a LTE evolved packet core (EPC), and/or the like. The core network may include AMF device 215, UPF device 220, and/or PCF device 225 that enable UE 205 to communicate with network 230.

UE 205 includes one or more devices capable of communicating with base station 210 and/or a network (e.g., network 230). For example, UE 205 may include a wireless communication device, an IoT device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 205 may send traffic to and/or receive traffic from network 230 (e.g., via base station 210, UPF device 220, and/or the like).

Base station 210 includes one or more devices capable of transferring traffic, such as audio, video, text, data and/or other traffic, destined for and/or received from UE 205. In some implementations, base station 210 may receive traffic from and/or sends traffic to network 230 via UPF device 220 and/or the like. Base station 210 may send traffic to and/or receive traffic from UE 205 via an air interface. In some implementations, base station 210 may include one or more small cell base stations, such as a base station of a microcell, a picocell, and/or a femtocell; one or more macrocell base stations, such as a NodeB, an eNodeB, a gNodeB, and/or the like. In some implementations, base station 210 may be associated with a particular cell type, of a plurality of cell types, that corresponds to a cell property associated with a cell associated with base station 210. For example, the particular cell type may be a high frequency cell type, a short range cell type, a stadium cell type, a low-bandwidth cell type, a mall cell type, a police station cell type, a hospital cell type, an airport cell type, and/or the like.

AMF device 215 includes one or more devices, such as one or more server devices, one or more virtualized devices, one or more cloud-computing devices, and/or the like, capable of managing authentication, activation, deactivation, and/or mobility functions associated with UE 205. In some implementations, AMF device 215 may be a mobility management entity (MME) device. In some implementations, AMF device 215 may perform operations relating to authentication of UE 205. Additionally, or alternatively, AMF device 215 may facilitate the selection of a particular UPF device 220 to serve traffic to and/or from UE 205. AMF device 215 may perform operations associated with handover of UE 205 from a first base station 210 to a second base station 210 when UE 205 transitions from a first cell associated with the first base station 210 to a second cell associated with the second base station 210. Additionally, or alternatively, AMF device 215 may select another AMF device (not pictured), to which UE 205 should be handed off (e.g., when UE 205 moves out of range of AMF device 215).

In some implementations, AMF device 215 may store information identifying a plurality of cell types. For example, the plurality of cell types may include a particular cell type associated with base station 210, as described herein. In some implementations, AMF device 215 may update the information identifying the plurality of cell types, for example, by adding new cell types, removing cell types, and/or the like. In some implementations, AMF device 215 may generate and transmit a notification to PCF device 225. For example, the notification may include information identifying UE 205, information identifying a cell in which UE 205 is located, information identifying a cell type associated with base station 210, and/or the like.

UPF device 220 includes one or more devices capable of providing connectivity for UE 205 to external packet data networks (e.g., other than the depicted core network). For example, UPF device 220 may include one or more data processing and/or traffic transfer devices, such as a cloud-computing device, a virtual device, a router, a modem, a switch, a firewall, a network interface card (NIC), a hub, a bridge, a server device, an optical add-drop multiplexer (OADM), a packet data network gateway (PGW), a serving gateway (SGW), and/or any other type of device that processes and/or transfers traffic. In some implementations, UPF device 220 may receive a policy rule from PCF device 225. In some implementations, UPF device 220 may apply the policy rule to a communications session associated with UE 205. For example, if the policy rule specifies a bandwidth limitation for UE 205, and UE 205 is receiving a video stream, UPF device 220 may apply the policy rule by limiting a transfer rate of the video stream.

PCF device 225 includes one or more devices, such as one or more server devices, one or more virtualized devices, one or more cloud-computing devices, and/or the like, capable of generating, maintaining, and distributing policy rules. In some implementations, PCF device 225 may include a policy control and rules function (PCRF) device. In some implementations, PCF device 225 may generate, store, and/ or provide policy rules (e.g., a traffic steering rule, a usage reporting rule, a packet inspection rule, a QoS rule, a charging rule, etc.). For example, PCF device 225 may provide one or more policy rules to UPF device 220 so that the UPF device may apply the one or more policy rules. In some implementations, PCF device 225 may associate one or more policy rules with a particular cell type. For example, PCF device 225 may store the associations between policy rules and cell types in a data structure and, when UE 205 is located in a particular cell, may provide one or more policy rules, associated with a cell type of the particular cell, to UPF device 220.

Network 230 may include one or more wired and/or wireless networks. For example, network 230 may include a telecommunications network (e.g., a 5G network, a LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
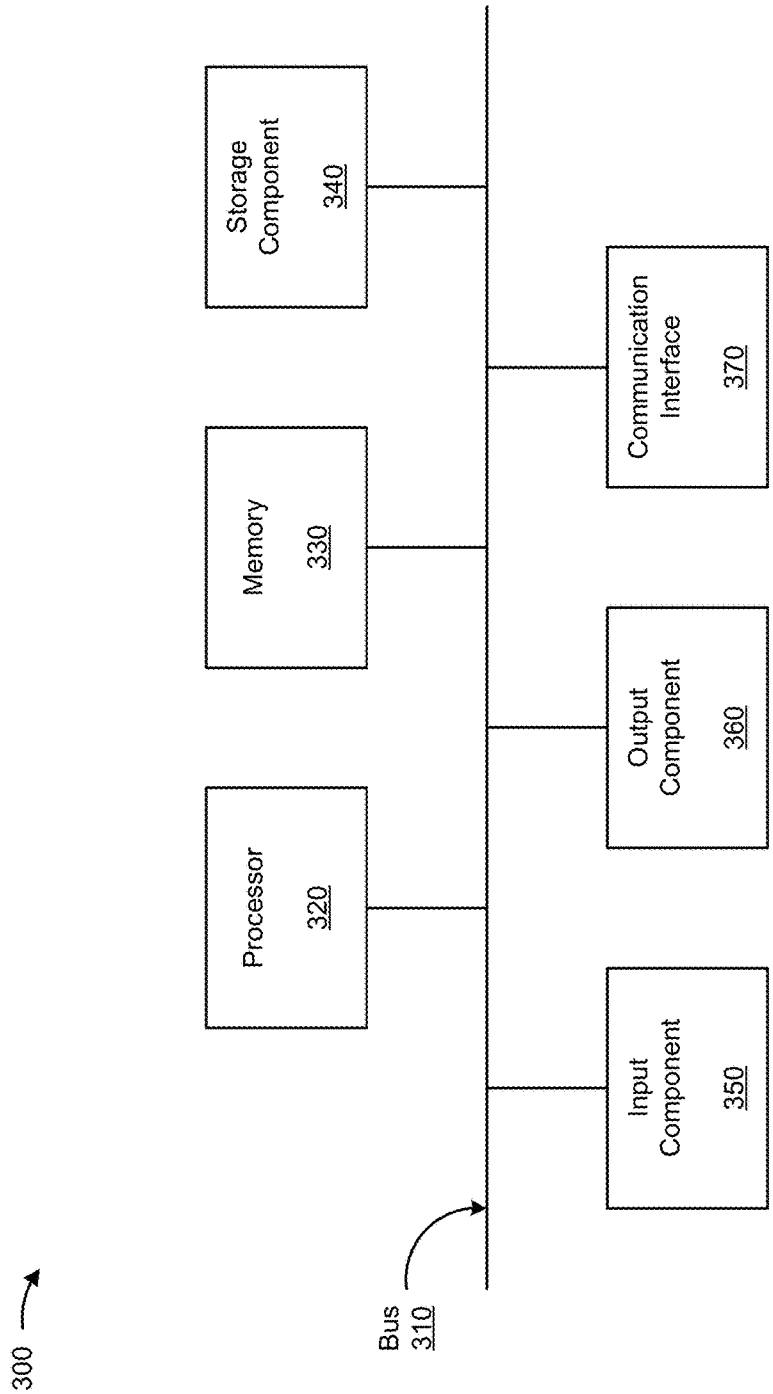
FIG. 3 is a diagram of example components of one or more devices of FIG. 2.

FIG. 3 is a diagram of example components of a device 300. Device 300 may correspond UE 205, base station 210, AMF device 215; UPF device 220; PCF device 225; and/or one or more devices included in network 230. In some implementations UE 205, base station 210, AMF device 215; UPF device 220; PCF device 225; and/or one or more devices included in network 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
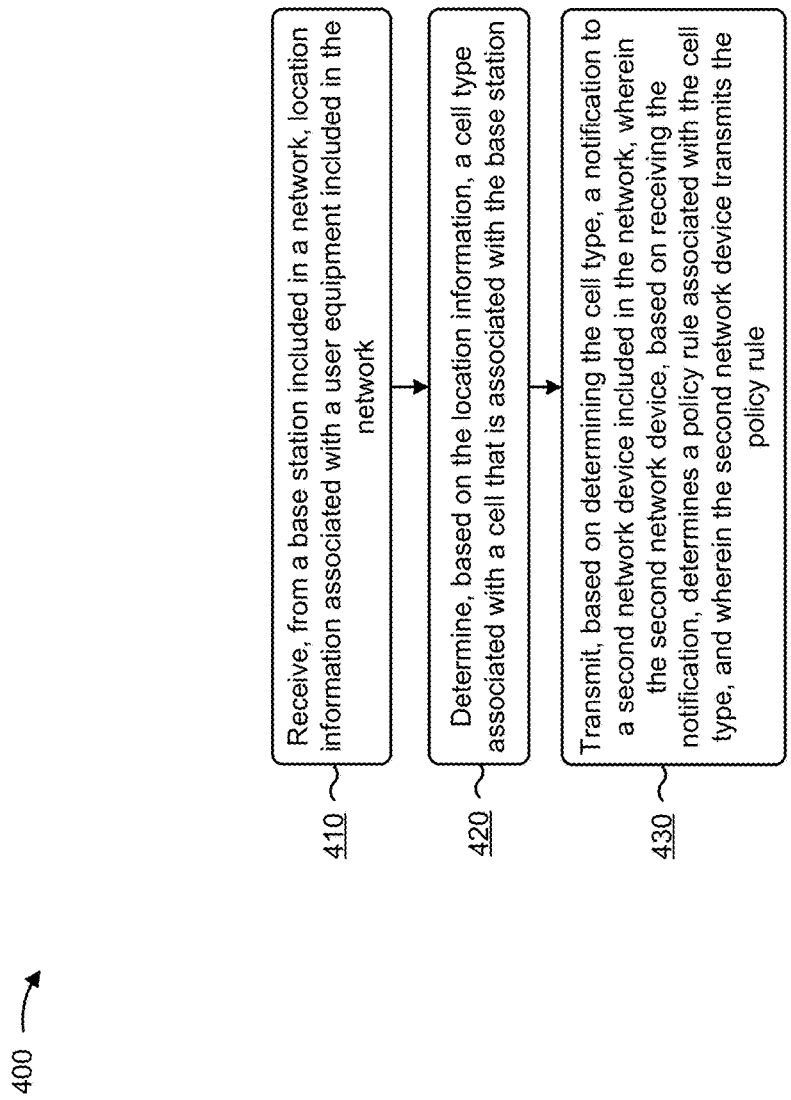
FIG. 4 is a flow chart of an example process for applying policy rules in a mobile network.

FIG. 4 is a flow chart of an example process 400 for applying policy rules in a mobile network. In some implementations, one or more process blocks of FIG. 4 may be performed by a network device such as an AMF device (e.g., AMF device 215). In some implementations, one or more process blocks of FIG. 4 may be performed by another device or a group of devices separate from or including the network device, such as a user equipment (e.g., UE 205), a base station (e.g., base station 210), a UPF device (e.g., UPF device 220), a PCF device (e.g., PCF device 225), and/or the like.

As shown in FIG. 4, process 400 may include receiving, from a base station included in a network, location information associated with a user equipment included in the network (block 410). For example, the network device (e.g., using processor 320, memory 330, storage component 340, input component 350, communication interface 370, and/or the like) may receive, from a base station included in a network, location information associated with a user equipment included in the network, as described above in connection with FIGS. 1A-1J.

As further shown in FIG. 4, process 400 may include determining, based on the location information, a cell type associated with a cell that is associated with the base station (block 420). For example, the network device (e.g., using processor 320, memory 330, storage component 340, and/or the like) may determine, based on the location information, a cell type associated with a cell that is associated with the base station, as described above in connection with FIGS. 1A-1J.

As further shown in FIG. 4, process 400 may include transmitting, based on determining the cell type, a notification to a second network device included in the network, wherein the second network device, based on receiving the notification, determines a policy rule associated with the cell type, and wherein the second network device transmits the policy rule (block 430). For example, the network device (e.g., using processor 320, memory 330, storage component 340, output component 360, communication interface 370, and/or the like) may transmit, based on determining the cell type, a notification to a second network device (e.g., a PCF device such as PCF device 225) included in the network, as described above in connection with FIGS. 1A-1J. In some implementations, the second network device may determine, based on receiving the notification, a policy rule associated with the cell type. In some implementations, the second network device may transmit the policy rule.

Process 400 may include additional implementations, such as any single implementation or any combination of implementations described below and/or described with regard to any other process described herein.

In some implementations, when receiving the location information associated with the user equipment, the network device may receive the location information based on a handover of the user equipment between another cell, associated with another base station included in the network, and the cell associated with the base station. In some implementations, when transmitting the notification to the second network device, the network device may transmit the notification to the second network device based on determining that the cell type associated with the cell that is associated with the base station is different from another cell type associated with the other cell that is associated with the other base station.

In some implementations, the location information associated with the user equipment may include an identifier associated with at least one of the base station or the cell associated with the base station. In some implementations, the identifier may include information identifying the cell type associated with the cell that is associated with the base station. In some implementations, the notification transmitted to the second network device may include a presence reporting area notification. In some implementations, the presence reporting area notification may include information indicating that the user equipment has entered a presence reporting area.

In some implementations, the network device may include an access management function (AMF) device. In some implementations, the second network device may include a policy control function (PCF) device. In some implementations, the second network device may transmit the policy rule to a third network device, included in the network, to apply the policy rule to a communications session associated with the user equipment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for applying policy rules in a mobile network. In some implementations, one or more process blocks of FIG. 5 may be performed by a network device such as an AMF device (e.g., AMF device 215). In some implementations, one or more process blocks of FIG. 5 may be performed by another device or a group of devices separate from or including the network device, such as a user equipment (e.g., UE 205), a base station (e.g., base station 210), a UPF device (e.g., UPF device 220), a PCF device (e.g., PCF device 225), and/or the like.

As shown in FIG. 5, process 500 may include receiving, from a base station included in the network, location information associated with a user equipment included in the network (block 510). For example, the network device (e.g., using processor 320, memory 330, storage component 340, input component 350, communication interface 370, and/or the like) may receive, from a base station included in the network, location information associated with a user equipment included in the network, as described above in connection with FIGS. 1A-1J.

As further shown in FIG. 5, process 500 may include determining, based on the location information, a cell type associated with a cell that is associated with the base station (block 520). For example, the network device (e.g., using processor 320, memory 330, storage component 340, and/or the like) may determine, based on the location information, a cell type associated with a cell that is associated with the base station, as described above in connection with FIGS. 1A-1J.

As further shown in FIG. 5, process 500 may include determining, based on determining the cell type, a presence reporting area identifier associated with the cell type (block 530). For example, the network device (e.g., using processor 320, memory 330, storage component 340, and/or the like) may determine, based on determining the cell type, a presence reporting area identifier associated with the cell type, as described above in connection with FIGS. 1A-1J.

As further shown in FIG. 5, process 500 may include transmitting, based on determining the presence reporting area identifier, a presence reporting area notification to a second network device included in the network, wherein the presence reporting area notification includes information identifying the presence reporting area identifier, wherein the second network device is to determine, based on the presence reporting area identifier identified in the presence reporting area notification, a policy rule associated with the cell type, and wherein the second network device is to transmit the policy rule to a third network device, included in the network, to apply the policy rule to a communications session associated with the user equipment (block 540). For example, the network device (e.g., using processor 320, memory 330, storage component 340, output component 360, communication interface 370, and/or the like) may transmit, based on determining the presence reporting area identifier, a presence reporting area notification to a second network device (e.g., a PCF device such as PCF device 225) included in the network, as described above in connection with FIGS. 1A-1J. In some implementations, the presence reporting area notification may include information identifying the presence reporting area identifier. In some implementations, the second network device may be to determine, based on the presence reporting area identifier identified in the presence reporting area notification, a policy rule associated with the cell type, and the second network device may be to transmit the policy rule to a third network device (e.g., a UPF device such as UPF device 220), included in the network, to apply the policy rule to a communications session associated with the user equipment.

Process 500 may include additional implementations, such as any single implementation or any combination of implementations described below and/or described with regard to any other process described herein.

In some implementations, the policy rule may include a quality of service (QoS) policy rule, a usage reporting policy rule, a charging policy rule, a packet inspection policy rule, and/or a traffic steering policy rule. In some implementations, the location information associated with the user equipment may include an identifier. In some implementations, the identifier may include information identifying a base station identifier assigned to the base station, and information identifying the cell type associated with the cell that is associated with the base station.

In some implementations, when determining the cell type associated with the cell that is associated with the base station, the network device may determine a plurality of cell types associated with the cell that is associated with the base station. In some implementations, the second network device may be to determine a policy rule associated with the plurality of cell types. In some implementations, the plurality of cell types associated with the cell that is associated with the base station may be encoded in a data string included in an identifier associated with the base station, and the identifier associated with the base station may be included in the location information associated with the user equipment.

In some implementations, when determining the cell type associated with the cell that is associated with the base station, the network device may identify, based on the location information associated with the user equipment, a new radio (NR) cell identifier (NCI) associated with the base station. In some implementations, the NCI may include a first identifier associated with the base station, a second identifier associated with the cell that is associated with the base station, and one or more data bits associated with the cell type. Additionally, the network device may determine the cell type based on the one or more data bits included in the NCI.

In some implementations, when receiving the location information associated with the user equipment, the network device may receive the location information in a signaling message between the base station and the network device. In some implementations, when determining the cell type associated with the cell that is associated with the base station, the network device may determine the cell type based on information included in a cell type field included in the signaling message.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for applying policy rules in a mobile network. In some implementations, one or more process blocks of FIG. 6 may be performed by a network device such as an AMF device (e.g., AMF device 215). In some implementations, one or more process blocks of FIG. 6 may be performed by another device or a group of devices separate from or including the network device, such as a user equipment (e.g., UE user equipment 205), a base station (e.g., base station 210), a UPF device (e.g., UPF device 220), a PCF device (e.g., PCF device 225), and/or the like.

As shown in FIG. 6, process 600 may include receiving, from a first base station included in a network, location information associated with a user equipment included in the network, wherein the location information is received based on a handover of the user equipment between a first cell associated with the first base station and a second cell associated with a second base station (block 610). For example, the network device (e.g., using processor 320, memory 330, storage component 340, input component 350, communication interface 370, and/or the like) may receive, from a first base station included in a network, location information associated with a user equipment included in the network, as described above in connection with FIGS. 1A-1J. In some implementations, the location information is received based on a handover of the user equipment between a first cell associated with the first base station and a second cell associated with a second base station.

As further shown in FIG. 6, process 600 may include determining, based on the location information, a cell type associated with the first cell that is associated with the first base station (block 620). For example, the network device (e.g., using processor 320, memory 330, storage component 340, and/or the like) may determine, based on the location information, a cell type associated with the first cell that is associated with the first base station, as described above in connection with FIGS. 1A-1J.

As further shown in FIG. 6, process 600 may include determining, based on determining the cell type, a presence reporting area identifier associated with the cell type (block 630). For example, the network device (e.g., using processor 320, memory 330, storage component 340, and/or the like) may determine, based on determining the cell type, a presence reporting area identifier associated with the cell type, as described above in connection with FIGS. 1A-1J.

As further shown in FIG. 6, process 600 may include transmit, based on determining the presence reporting area identifier, a presence reporting area notification to a second network device included in the network, wherein the presence reporting area notification includes information identifying the presence reporting area identifier, wherein the second network device is to determine, based on the presence reporting area identifier identified in the presence reporting area notification, a policy rule associated with the cell type, and wherein the second network device is to transmit the policy rule to a third network device, included in the network, to apply the policy rule to a communications session associated with the user equipment (block 640). For example, the network device (e.g., using processor 320, memory 330, storage component 340, output component 360, communication interface 370, and/or the like) may transmit, based on determining the presence reporting area identifier, a presence reporting area notification to a second network device (e.g., a PCF device such as PCF device 225) included in the network, as described above in connection with FIGS. 1A-1J. In some implementations, the presence reporting area notification may include information identifying the presence reporting area identifier. In some implementations, the second network device may be to determine, based on the presence reporting area identifier identified in the presence reporting area notification, a policy rule associated with the cell type. In some implementations, the second network device may be to transmit the policy rule to a third network device (e.g., a UPF device such as UPF device 220), included in the network, to apply the policy rule to a communications session associated with the user equipment.

Process 600 may include additional implementations, such as any single implementation or any combination of implementations described below and/or described with regard to any other process described herein.

In some implementations, the network device may determine, based on the cell type associated with the first cell that is associated with the first base station, whether the cell type associated with the first cell that is associated with the first base station is different from another cell type associated with the second cell that is associated with the second base station. In some implementations, when determining the presence reporting area identifier associated with the cell type, the network device may determine the presence reporting area identifier associated with the cell type based on determining that the cell type associated with the first cell that is associated with the first base station is different from the other cell type associated with the second cell that is associated with the second base station.

In some implementations, the location information associated with the user equipment may include an identifier associated with the first base station and the first cell associated with the first base station. In some implementations, the identifier associated with the first base station and the first cell associated with the first base station may include information identifying the cell type associated with the first cell that is associated with the first base station.

In some implementations, the cell type associated with the first cell that is associated with the first base station may identify the first cell as being associated with a stadium, and the policy rule associated with the cell type may include a quality of service (QoS) policy rule that specifies a bandwidth limitation for the communications session associated with the user equipment. In some implementations, when receiving the location information associated with the user equipment, the network device may receive the location information in a signaling message from the first base station on a S1 or N2 interface between the first base station and the network device. In some implementations, the cell type associated with the first cell that is associated with the first base station may include a plurality of cell types, and the policy rule may include a plurality of policy rules.

Although FIG. 6 shows example blocks of process 600, in some implementations, process 400 may include additional blocks, fewer blocks, different blocks, or differently arranged blocks than those depicted in FIG. 6. Additionally, or alternatively, two or more of the blocks of process 600 may be performed in parallel.

Some implementations described herein provide a network device, such as an AMF device (e.g., AMF device 215), that may receive, from a base station 210 included in a network, location information associated with a UE 205 included in the network, and may determine, based on the location information, a cell type associated with a cell that is associated with base station 210. The network device may transmit, based on determining the cell type, a notification to a second network device, such as a PCF device (e.g., PCF device 225), included in the network. In this way, the second network device may receive the notification, may determine, based on receiving the notification, a policy rule associated with the cell type, and may transmit the policy rule to a third network device (e.g., a UPF device such as UPF device 220), included in the network, to apply the policy rule to a communications session associated with UE 205.

In this way, the network device does not need to store and maintain a list of cells in the mobile network and the policy rules or cell types associated with the cells. This reduces the usage of storage resources of the network device, as well as reduces the complexity of operating and maintaining the mobile network. Moreover, in this way, policy rules may be applied differently in different cells in the mobile network, which allows the mobile network to accommodate different and/or changing operating conditions in different cells, as well as combinations of different combinations in a particular cell, which in turn allows the network to more efficiently use available network resources as well as customize and optimize coverage and capacity in the mobile network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term traffic or content may include a set of packets. A packet may refer to a communications structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors, communicatively coupled to the one or more memories, to:
receive, from a base station included in a network, location information associated with a user equipment included in the network;
determine, based on the location information, a cell type associated with a cell that is associated with the base station; and
transmit, based on determining the cell type, a notification to a second network device included in the network,
wherein the second network device, based on receiving the notification, determines a policy rule associated with the cell type, and
wherein the second network device transmits the policy rule.

2. The network device of claim 1, wherein the one or more processors, when receiving the location information associated with the user equipment, are to:
receive the location information based on a handover of the user equipment between another cell, associated with another base station included in the network, and the cell associated with the base station.

3. The network device of claim 2, wherein the one or more processors, when transmitting the notification to the second network device, are to:
transmit the notification to the second network device based on determining that the cell type associated with the cell that is associated with the base station is different from another cell type associated with the other cell that is associated with the other base station.

4. The network device of claim 1, wherein the location information associated with the user equipment comprises:
an identifier associated with at least one of the base station or the cell associated with the base station,
wherein the identifier comprises:
information identifying the cell type associated with the cell that is associated with the base station.

5. The network device of claim 1, wherein the notification transmitted to the second network device comprises:
a presence reporting area notification,
wherein the presence reporting area notification includes information indicating that the user equipment has entered a presence reporting area.

6. The network device of claim 1, wherein the network device includes an access management function (AMF) device; and
wherein the second network device includes a policy control function (PCF) device.

7. The network device of claim 1, wherein the second network device transmits the policy rule to a third network device, included in the network, to apply the policy rule to a communications session associated with the user equipment.

8. A method, comprising:
receiving, at a network device, and from a base station included in a network, location information associated with a user equipment included in the network;
determining, by the network device and based on the location information, a cell type associated with a cell that is associated with the base station;
determining, by the network device and based on determining the cell type, a presence reporting area identifier associated with the cell type; and transmitting, by the network device and based on determining the presence reporting area identifier, a presence reporting area notification to a second network device included in the network,
 wherein the presence reporting area notification includes information identifying the presence reporting area identifier,
 wherein the second network device is to determine, based on the presence reporting area identifier identified in the presence reporting area notification, a policy rule associated with the cell type, and
 wherein the second network device is to transmit the policy rule to a third network device, included in the network, to apply the policy rule to a communications session associated with the user equipment.

9. The method of claim 8, wherein the policy rule includes at least one of:
 a quality of service (QoS) policy rule,
 a usage reporting policy rule,
 a charging policy rule,
 a packet inspection policy rule, or
 a traffic steering policy rule.

10. The method of claim 8, wherein the location information associated with the user equipment comprises:
 an identifier,
  wherein the identifier comprises:
   information identifying a base station identifier assigned to the base station; and
   information identifying the cell type associated with the cell that is associated with the base station.

11. The method of claim 8, wherein determining the cell type associated with the cell that is associated with the base station comprises:
 determining a plurality of cell types associated with the cell that is associated with the base station,
  wherein the second network device is to determine a policy rule associated with the plurality of cell types.

12. The method of claim 11, wherein the plurality of cell types associated with the cell that is associated with the base station are encoded in a data string included in an identifier associated with the base station, and
 wherein the identifier associated with the base station is included in the location information associated with the user equipment.

13. The method of claim 8, wherein determining the cell type associated with the cell that is associated with the base station comprises:
 identifying, based on the location information associated with the user equipment, a new radio (NR) cell identifier (NCI) associated with the base station,
  wherein the NCI includes:
   a first identifier associated with the base station,
   a second identifier associated with the cell that is associated with the base station, and
   one or more data bits associated with the cell type; and
 determining the cell type based on the one or more data bits included in the NCI.

14. The method of claim 8, wherein receiving the location information associated with the user equipment comprises:
 receiving the location information in a signaling message between the base station and the network device; and
 wherein determining the cell type associated with the cell that is associated with the base station comprises:
  determining the cell type based on information included in a cell type field included in the signaling message.

15. A non-transitory computer-readable medium storing instructions, the instructions comprising:
 one or more instructions that, when executed by one or more processors of a network device, cause the one or more processors to:
  receive, from a first base station included in a network, location information associated with a user equipment included in the network,
   wherein the location information is received based on a handover of the user equipment between a first cell associated with the first base station and a second cell associated with a second base station;
  determine, based on the location information, a cell type associated with the first cell that is associated with the first base station;
  determine, based on determining the cell type, a presence reporting area identifier associated with the cell type; and
  transmit, based on determining the presence reporting area identifier, a presence reporting area notification to a second network device included in the network,
   wherein the presence reporting area notification includes information identifying the presence reporting area identifier,
   wherein the second network device is to determine, based on the presence reporting area identifier identified in the presence reporting area notification, a policy rule associated with the cell type, and
   wherein the second network device is to transmit the policy rule to a third network device, included in the network, to apply the policy rule to a communications session associated with the user equipment.

16. The non-transitory computer-readable medium of claim 15, wherein the one or more instructions, when executed by the one or more processors, cause the one or more processors to:
 determine, based on the cell type associated with the first cell that is associated with the first base station, whether the cell type associated with the first cell that is associated with the first base station is different from another cell type associated with the second cell that is associated with the second base station,
  wherein the one or more instructions, that cause the one or more processors to determine the presence reporting area identifier associated with the cell type, are to:
   determine the presence reporting area identifier associated with the cell type based on determining that the cell type associated with the first cell that is associated with the first base station is different from the other cell type associated with the second cell that is associated with the second base station.

17. The non-transitory computer-readable medium of claim 15, wherein the location information associated with the user equipment comprises:
 an identifier associated with the first base station and the first cell associated with the first base station,
  wherein the identifier associated with the first base station and the first cell associated with the first base station includes information identifying the cell type associated with the first cell that is associated with the first base station.

18. The non-transitory computer-readable medium of claim 15, wherein the cell type associated with the first cell that is associated with the first base station identifies the first cell as being associated with a stadium, and wherein the policy rule associated with the cell type includes a quality of service (QoS) policy rule that specifies a bandwidth limitation for the communications session associated with the user equipment.

19. The non-transitory computer-readable medium of claim 15, wherein the one or more instructions, that cause the one or more processors to receive the location information associated with the user equipment, are to:

receive the location information in a signaling message from the first base station on a S1 or N2 interface between the first base station and the network device.

20. The non-transitory computer-readable medium of claim 15, wherein the cell type associated with the first cell that is associated with the first base station includes a plurality of cell types, and wherein the policy rule includes a plurality of policy rules.

* * * * *